Jan. 26, 1932.    H. O. FLETCHER    1,842,397
MILLING MACHINE
Filed Jan. 2, 1930    3 Sheets-Sheet 1

WITNESSES:
Anthony Mitchell
Annie Mitchell

INVENTOR:
Henry O. Fletcher

Jan. 26, 1932.                H. O. FLETCHER                 1,842,397
                              MILLING MACHINE
                          Filed Jan. 2, 1930         3 Sheets-Sheet 2

WITNESSES:                                    INVENTOR:
Anthony Mitchell                              Henry O. Fletcher
Anna Mitchell Jan. 26, 1932.  H. O. FLETCHER  1,842,397
MILLING MACHINE
Filed Jan. 2, 1930   3 Sheets-Sheet 3

WITNESSES:
Anthony Mitchell
Anna Mitchell

INVENTOR:
Henry O. Fletcher

Patented Jan. 26, 1932

1,842,397

UNITED STATES PATENT OFFICE

HENRY O. FLETCHER, OF ANSONIA, CONNECTICUT

MILLING MACHINE

Application filed January 2, 1930. Serial No. 417,986.

My invention relates more particularly to milling machines for forming irregular shapes, or profiles on metal parts, but may be used for a variety of operations on parts of regular form.

The objects of my invention are to increase production, facilitate operation, simplify manufacture, produce accurate work, and to produce more than one kind of profile by a single set up.

This application is supplementary to my application of a similar nature dated December 25th, 1929, Serial No. 416,308, and the embodiments herein shown are additional manners in which I accomplish the same purpose. The embodiments herein shown are illustrated as being mounted upon the same base and driven by the same motor and driving mechanism as illustrated and explained in my application dated December 25, 1929.

Figure 1:
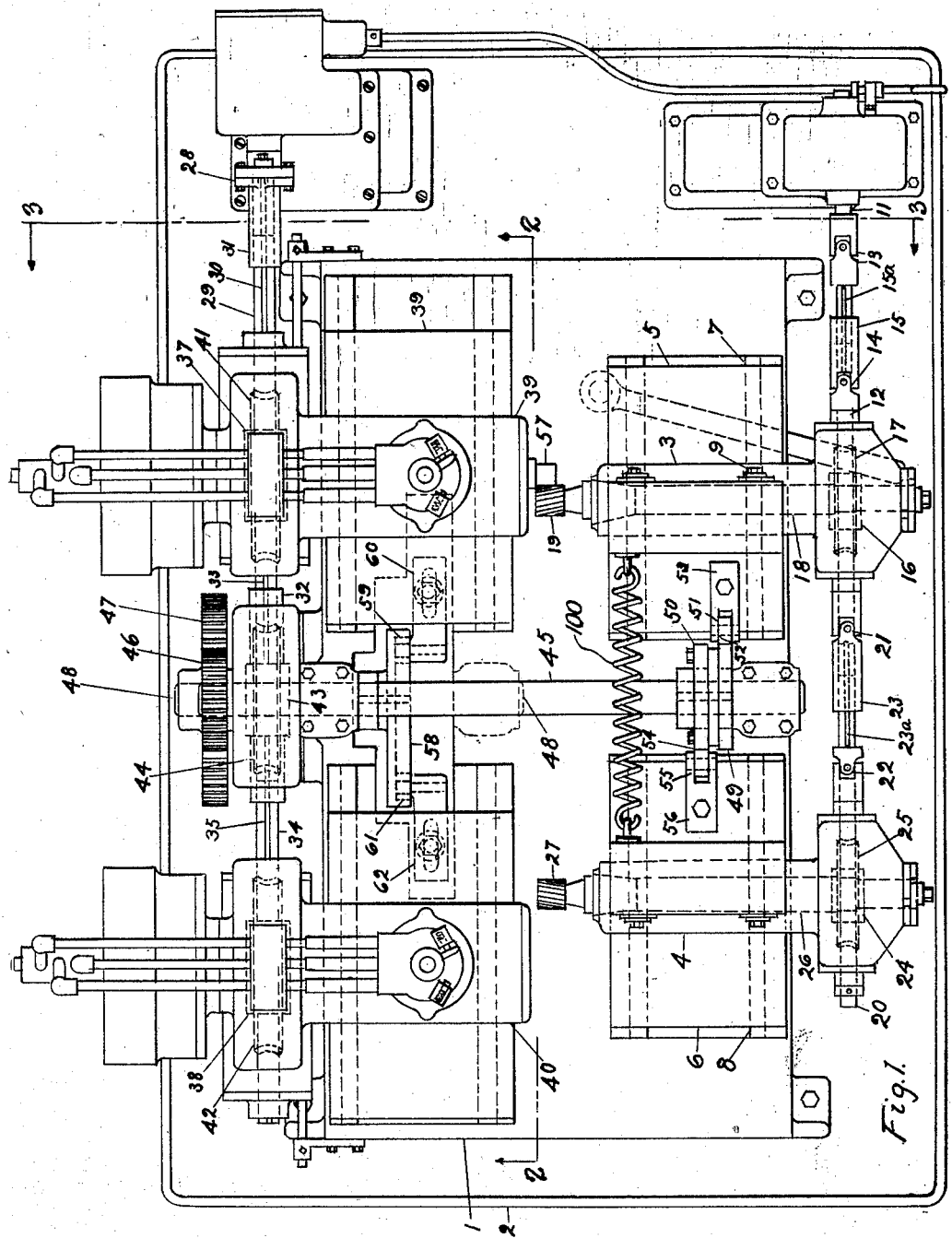
Figure 2:
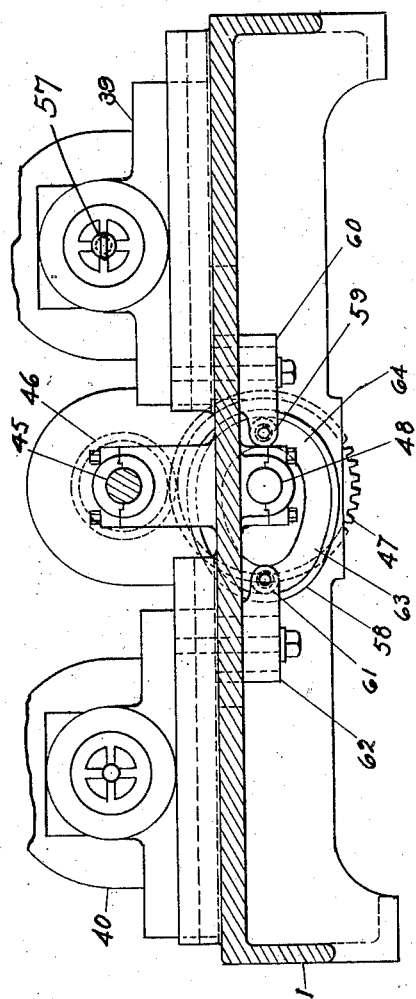
Figure 3:
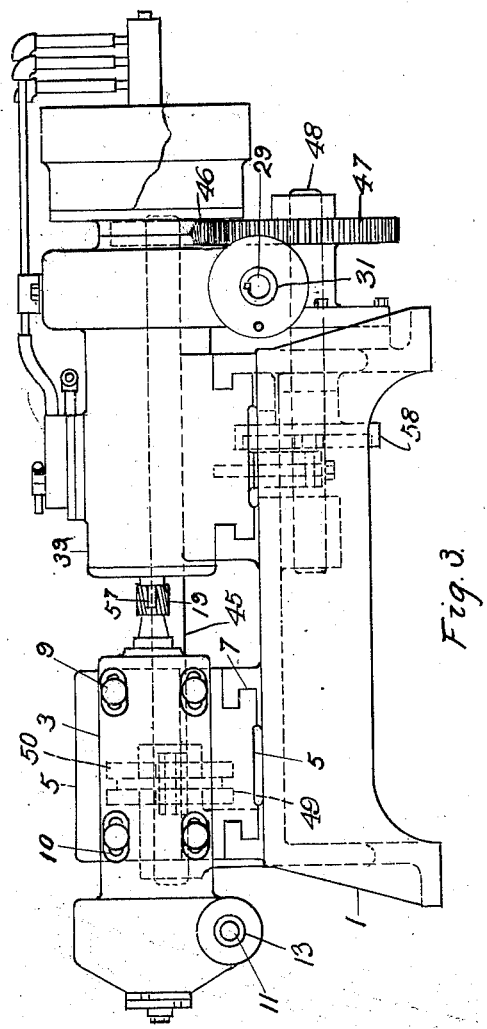
Figure 4:
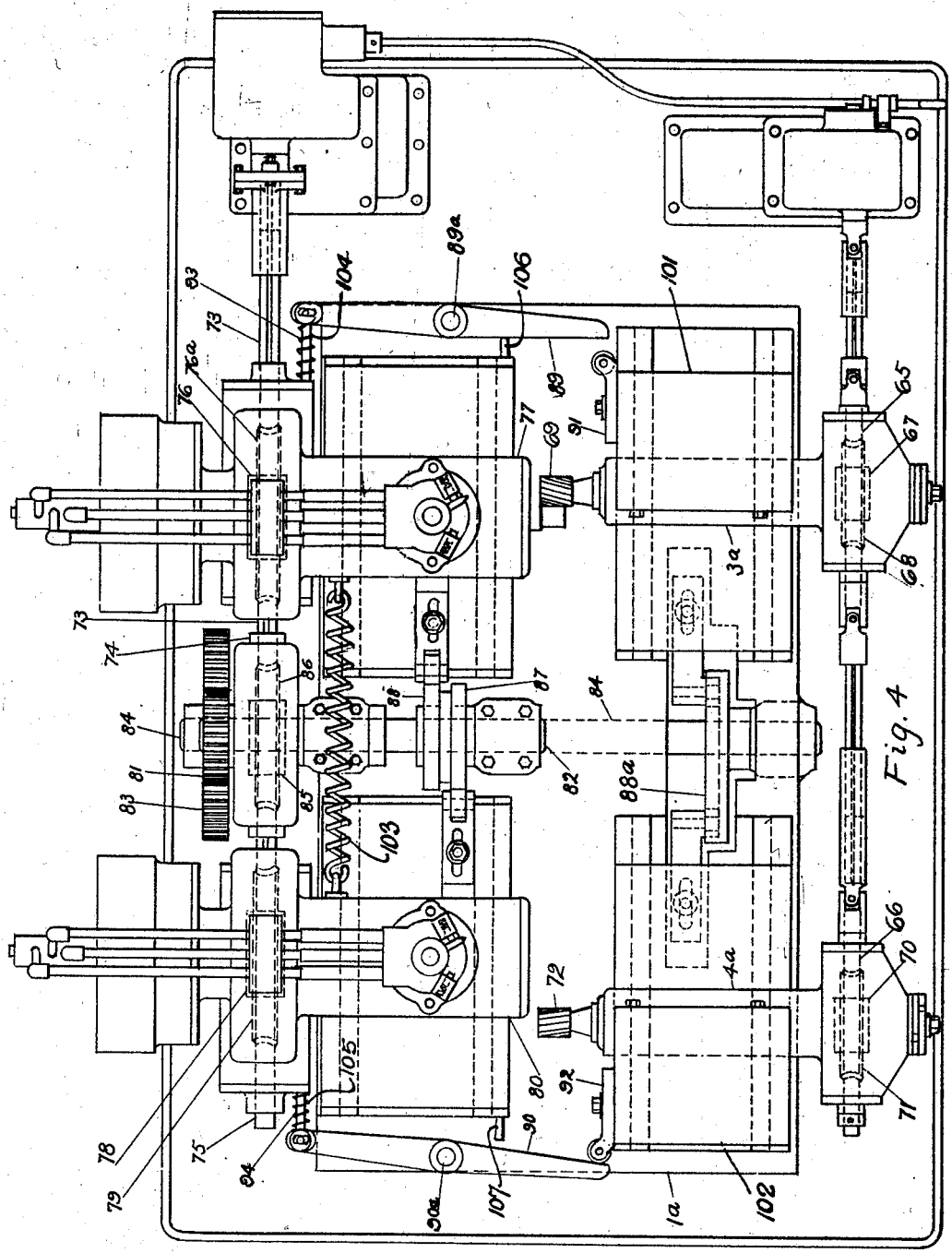

Fig. 1 is a plan view of one embodiment of my invention. Fig. 2 is a section taken in side elevation on line 2—2, of Fig. 1. Fig. 3 is a section taken in end elevation on line 3—3, of Fig. 1. Fig. 4 is a plan view of another embodiment of my invention.

Referring to Figs. 1, 2 and 3, the table 1, upon which the mechanism is mounted, is supported by cabinet base 2. The cutter blocks 3 and 4, are adjustably clamped by means of screws 9, and slots 10, to slides 5 and 6, respectively. The slide 5, reciprocates in the guide 7, formed in table 1, and, slide 6, reciprocates in guide 8, also formed in table 1.

The shaft 11, driven by a motor, not shown, is connected to shaft 12, by means of universal joints 13, and 14, telescoping sleeve 15, and key 15a. The worm 16, fast on shaft 12, meshes with worm gear 17, fast on cutter spindle 18, on which cutter 19, is rigidly mounted. The shaft 12, drives shaft 20, by means of universal joints 21 and 22, telescoping sleeve 23, and key 23a. The worm 24, fast on shaft 20, meshes with worm gear 25, fast on cutter spindle 26, on which cutter 27, is rigidly mounted.

The universal coupling 28, also driven by motor, not shown, drives shaft 29, by means of key 30, shaft 29, being adapted to slide in sleeve 31, formed on coupling 28. In a like manner shaft 29, drives the hollow shaft 32, by means of key 33, shaft 29, being adapted to slide within shaft 32. In turn shaft 32, drives shaft 34, by key 35, shaft 34, being adapted to slide in shaft 32. Worm 37, is freely mounted on shaft 29, and worm 38, is freely mounted on shaft 34, the worms 37, and 38, being driven by clutches as fully illustrated, and described in the previous application mentioned above. (See Fig. 6).

The worms 37, and 38, mesh with worm gears 41 and 42, respectively, which are fast on and drive the work spindles of headstocks 39 and 40, respectively in the same manner as illustrated in Fig. 5, of previous mentioned application. These headstocks, 39 and 40, are provided with expanding collets draw bolts, ejectors, and air chucks as described in afore-mentioned application.

The worm 43, is fast on shaft 32, and meshes with worm gear 44, fast on shaft 45. The pinion 46, fast on shaft 45, meshes with gear 47, fast on shaft 48.

The speed ratio of pinion 46, to gear 47, is two to one which causes shaft 48, to revolve half as fast as shaft 45.

The master forms 49 and 50, are fast on shaft 45, the master form 49, engages roll 51, rotatably mounted on pin 52, fast on shoe 53, which is clamped to slide 5, on which cutter block 3, is mounted. Master form 50, engages roll 54, rotatably mounted on pin 55, fast in shoe 56, which is clamped to slide 6, carrying cutter block 4.

As shaft 45, revolves, slowly turning master forms 49 and 50, the master form 49, slowly reciprocates cutter 19, to form work 57, and, master form 50, reciprocates cutter 27, in a similar manner, the extension spring 100, attached to slides 5, and 6, serving to press rolls 51 and 54, at all times against master forms 49 and 50, respectively, thus forcing cutters 19 and 27, to make the prescribed movement to cut the profiles.

The path cam 58, is fast on shaft 48, and engages roll 59, rotatably mounted on shoe 60, which is adjustably clamped to headstock 39. Cam 58, also engages roll 61, rotatably mounted on shoe 62, which is adjustably clamped to headstock 40. In the path 63, of cam 58, is formed a 180° dwell 64, which causes one of its engaged rolls to stand still during half of the revolution of cam 58.

During this time the master forms 49 and 50, have made a complete cycle, thus producing a complete profile on work 57.

The other 180° of path 63, of cam 58, is formed to move the other roll and consequently its headstock away from and back into working relation with its corresponding cutter. Thus it will be seen that cam 58, alternately moves the headstocks 39 and 40, so that the spindle of one has produced a complete piece of work while the other is in inoperative position. All of the working parts not herein described are fully illustrated and described in the previously mentioned application.

Referring to Fig. 4, the shafts 65, and 66, are driven in a similar manner to shafts 12 and 20, respectively, as shown. The worms 67, fast on shaft 65, meshes with worm gear 68, which drives cutter 69; and, the worm 70, fast on shaft 66, meshes with worm gear 71, which drives cutter 72 in the same manner that worm gear 17 and 25, drive cutters 19 and 27, respectively.

The shaft 73, is driven similarly to shaft 29, and drives hollow shaft 74 and shaft 75 in a similar manner as described for shafts 32 and 34. The worm 76, meshing with worm gear 76a, drives the work spindle of headstock 77; and, worm 78, meshing with worm gear 79, drives the spindle of headstock 80, in the same manner that gears 41 and 42, drive the spindles of headstocks 39 and 40. The worm 85, fast on shaft 74, meshes with worm gear 86, fast on shaft 82.

The pinion 81, fast on shaft 82, meshes with gear 83, fast on shaft 84, with a speed ratio of two to one similar to shafts 45 and 48.

The master forms 87 and 88, fast on shaft 82, operate to reciprocate the headstocks 77 and 80, respectively, in the same manner as master forms 49 and 50, operate to reciprocate cutter blocks 3 and 4, respectively, the extension spring 103, attached to headstocks 77 and 80, serving to hold headstocks 77 and 80, in proper position in relation to master forms 88 and 87, respectively, for cutting the profile.

The path cam 88a is identical in construction, and operation to cam 58, except that it operates to alternately move cutter block slides 101 and 102, carrying cutter blocks 3 and 4, out of and into, working position instead of moving headstocks out of and into working position.

The levers 89 and 90, fulcrumed on table 1a, at 89a, respectively, and push blocks 91 and 92, fast on cutter block slides 101 and 102, alternately engage levers 89 and 90, to operate rods 93 and 94, respectively, to start and stop the work spindles of headstocks 77 and 80, respectively. The compression spring 104, serves to return rod 93, and lever 89, to their original position, thus allowing the clutch of headstock 77, to start its spindle; and, compression spring 105, serves to return rod 94, and lever 90, in the same manner to start the spindle of headstock 80. The stops 106 and 107, serve to limit the movement of levers 89 and 90, respectively, on their return movement.

From the above it will be seen that in Fig. 1, the cutter blocks are reciprocated to form the profile, and the headstocks alternately reciprocated to separate the work from the cutters; while in Fig. 4, the opposite takes place; the headstocks are reciprocated to form the profile, and the cutters alternately reciprocated to separate them from the work.

It will be evident that, when the machine is producing circular work, the master forms will be circular in form; and, the headstock, or cutter block, controlled by a master form will have no movement. Therefore the master form may be omitted and the headstock, or cutter block may be clamped firmly in place.

The automatic operation of the air valves, air chucks, ejectors, and the cooling liquid, while not illustrated in this application, may be applied to the mechanism hereinshown with equal facility to that shown in my previous application, Serial No. 416,308.

Having explained my invention what I claim as new is set forth in the following claims:

1. In a profile milling machine, two movable headstocks; a work holding spindle rotatably mounted in each headstock; two movable cutter blocks; a cutter carrying spindle rotatably mounted in each cutter block; one cutter being adapted to operate on the work held by one work spindle, and the other cutter adapted to operate on the work held by the other work spindle; means to rotate the work and cutter spindles; automatic means to move the cutter blocks, in relation to the work spindles, to cut the profile; and automatic means to alternately move the headstocks, in relation to the cutter blocks, to remove one spindle away from operative relation with its cutter while the other work spindle is in operative relation with its cutter.

2. In a profile milling machine, two movable cutter blocks; a cutter carrying spindle rotatably mounted in each cutter block; two movable headstocks; a work holding spindle rotatably mounted in each headstock; one cutter being adapted to operate on the work held by one work spindle, and the other cutter adapted to operate on the work held by the other work spindle; means to rotate the spindles; automatic means to move the headstocks, in relation to the cutters to cut the profile; and automatic means to alternately move the cutter blocks in relation to the headstocks, to move one cutter out of operative relation with its work spindle while the other cutter is in operative relation with its work spindle.

3. In a profile milling machine, two movable headstocks; a work holding spindle rotatably mounted in each headstock; two movable cutter blocks; a cutter carrying spindle rotatably mounted in each cutter block; one cutter being adapted to operate on the work held by one work spindle, and the other cutter adapted to operate on the work held by the other work spindle; means to rotate the cutters; means to rotate the work spindles; automatic means to move the headstocks in relation to cutters for cutting the profile; automatic means to alternately move the cutter blocks to move one cutter out of operative relation with its work spindle, while the other cutter is in operative relation with its work spindle; and automatic means to stop the rotation of the inoperative work spindle as its corresponding cutter moves out of operative relation, and start it again as its corresponding cutter moves back into operative relation.

4. In a profile milling machine, two movable cutter blocks; a cutter carrying spindle rotatably mounted in each cutter block; two movable headstocks; a work holding spindle rotatably mounted in each headstock; one cutter being adapted to operate on the work held by one work spindle, and the other cutter adapted to operate on the work held by the other work spindle; means to rotate the cutter spindles; means to rotate the work spindles; automatic means to move the cutter blocks in relation to the work spindles for cutting the profile; automatic means to alternately move the headstocks to move one work spindle out of, and back into, operative relation with its cutter while the other work spindle is in operative relation with its cutter; and, automatic means to stop the rotation of the inoperative work spindle as it moves out of operative relation, and start it again as it moves back into operative relation with its cutter.

5. In a milling machine two movable work carrying elements and two movable cutter carrying elements arranged in pairs; one work carrying element, and one cutter carrying element in each pair; a work holding spindle rotatably mounted in each work carrying element; a cutter rotatably mounted in each cutter carrying element; each cutter being adapted to operate on the work held by the work holding spindle of its pair; means to rotate the work holding spindles and cutters; and, automatic means to move the two elements of each pair relative to each other for cutting the profile.

6. In a profile milling machine, two movable work carrying elements, and two movable cutter carrying elements arranged in pairs; one work carrying element and one cutter carrying element in each pair; a work holding spindle rotatably mounted in each work carrying element; a cutter rotatably mounted on each cutter carrying element; each cutter being adapted to operate on the work held by the work holding spindle of its pair; means to rotate the work holding spindles and cutters; automatic means to move the two elements of each pair relative to each other for cutting the profile; and automatic means to alternately move the elements of each pair relative to each other to separate the elements of one pair from operative relation with each other, while the elements of the other pair are in operative relation.

7. In a profile milling machine, two movable work carrying elements, and two movable cutter carrying elements arranged in pairs; one work carrying element and one cutter carrying element in each pair; a work holding spindle rotatably mounted in each work carrying element; a cutter rotatably mounted on each cutter carrying element; each cutter being adapted to operate on the work held by the work holding spindle of its pair; means to rotate the work holding spindles and cutters; automatic means to move the two elements of each pair relative to each other for cutting the profile; automatic means to alternately move the elements of each pair relative to each other to separate the elements of one pair from operative relation with each other, and bring them back into operative relation, while the elements of the other pair are in operative relation with each other; and, automatic means to stop the rotation of the work spindle of the inoperative work carrying element while it is in inoperative relation with its cutter carrying element, and start said spindle rotating as the inoperative work carrying elements return to operative relation with each other.

In testimony whereof, I hereunto set my hand.

HENRY O. FLETCHER.